United States Patent [19]
Bohl

[11] Patent Number: 5,460,147
[45] Date of Patent: Oct. 24, 1995

[54] CYCLONE SEPARATOR FOR AN INTERNAL COMBUSTION ENGINE

[75] Inventor: Matthias Bohl, Weinstadt, Germany

[73] Assignee: Knecht Filterwerke GmbH, Stuttgart, Germany

[21] Appl. No.: 357,865

[22] Filed: Dec. 16, 1994

[30]  Foreign Application Priority Data

Dec. 24, 1993 [DE] Germany ............... 43 44 506.3

[51] Int. Cl.⁶ ............................................. F02B 77/00
[52] U.S. Cl. ........................... 123/572; 55/DIG. 19
[58] Field of Search ............................ 123/572, 573; 55/DIG. 19, 466, 338

[56]  References Cited

U.S. PATENT DOCUMENTS

| | | | |
|---|---|---|---|
| 2,208,673 | 7/1940 | Hopkins | 123/573 |
| 2,731,958 | 1/1956 | Robley | 123/573 |
| 4,318,386 | 3/1982 | Showalter et al. | 123/549 |
| 4,338,784 | 7/1982 | Liu et al. | 60/279 |
| 4,409,950 | 10/1983 | Goldberg | 123/572 |
| 4,627,406 | 12/1986 | Namiki et al. | 123/573 |
| 4,724,807 | 2/1988 | Walker | 123/196 A |
| 4,947,806 | 8/1990 | Speer et al. | 121/198 C |
| 5,140,957 | 8/1992 | Walker | 123/198 E |
| 5,239,972 | 8/1993 | Takeyama et al. | 123/573 |

FOREIGN PATENT DOCUMENTS

| | | | |
|---|---|---|---|
| 3128470 | 5/1983 | Germany . | |
| 59-51120 | 3/1984 | Japan | 123/573 |

*Primary Examiner*—David A. Okonsky
*Attorney, Agent, or Firm*—Collard & Roe

[57]  ABSTRACT

A cylindrical cyclone separator connected between an air vent, a suction conduit and an oil sump all of an internal combustion engine. A duct extends spirally within the cyclone separator. Oil and aerosols are separated by an increasing centrifugal force as the oil/aerosol mixtures passes through the duct toward the center of the separator and the separator exhaust ports.

5 Claims, 2 Drawing Sheets

CYCLONE SEPARATOR FOR AN INTERNAL COMBUSTION ENGINE

BACKGROUND OF THE INVENTION

1. Field of the Invention

The invention relates to a cyclone separator for separating oil from aerosols in an internal combustion engine. The cyclone separator is connected between an air vent, a suction conduit, and an oil sump of the internal combustion engine.

2. The Prior Art

Cyclone separators are known from DE-PS 31 28 470 in which an air intake pipe is tangentially-mounted to a ring-shaped separation chamber. The chamber is bordered by a cylindrical inner surface of the cyclone housing and a cylindrical air exhaust pipe extending into the separation chamber. Aerosols flow within the separation chamber along a circular path.

The prior art separator has several drawbacks. Aerosols entering the top portion of the cyclone separator may circulate several times before being exhausted from the separator. Because of the hollow cylindrical configuration of the separation chamber, the fluid flow rate and centrifugal forces acting on the oil particles remains constant. As a result, very fine oil particles are not separated out of the mixture. The purpose of the invention is to increase the efficiency of the cyclone separator.

SUMMARY OF THE INVENTION

It is, therefore, an object of the present invention to overcome the drawbacks of the prior art and to provide a cyclone separator for an internal combustion engine with a greater centrifugal force for separating out oil particles from an oil/aerosol mixture.

It is a further object of the present invention to provide a cyclone separator with a duct spirally-extending from the intake port to the center of the cyclone separator.

It is yet another object of the present invention to provide a cyclone separator where the centrifugal force increases along the duct, at a constant fluid flow rate, so that progressively finer oil particles can be centrifuged out.

It is still another object of the present invention to provide a cyclone separator where the duct has a constant cross-sectional area along its length.

These and other related objects are achieved according to the invention by a cylindrical cyclone separator having a center and a tangentially-mounted intake port coupled to a vent for a space of an internal combustion engine via an intake conduit. The cyclone separator further includes a centrally-mounted aerosol exit port extending off the top of the cyclone separator and coupled to an engine suction conduit. The cyclone separator further includes a centrally-mounted oil outlet port extending off the bottom of the cyclone separator and coupled to an engine oil sump. A duct is disposed within the cyclone separator that extends spirally from the intake port to the center of the cyclone separator. Oil is separated from aerosols by an increasing centrifugal force as the oil and aerosols pass through the duct towards the center of the cyclone separator. Oil particles already centrifuged out are carried along the duct wall into the center of the cyclone separator.

The duct has a generally constant cross-sectional area along its length. The oil and aerosols pass through the duct at a constant flow rate. The duct has a rounded bottom surface along its length to prevent oil particles from depositing in corners. The duct has an end at the cyclone center where the rounded bottom surface merges directly into the oil outlet port. Oil particles collected along the rounded bottom surface can then flow directly into the oil outlet port. A cross-shaped insert is disposed within the aerosol exhaust port. The insert acts as an energy absorbing element for partially recovering spin energy.

In an alternate embodiment, the invention relates to a cylindrical cyclone separator having a center, a periphery, a top and a bottom. The cyclone separator includes an oil/aerosol intake port tangentially-mounted to the periphery of the cyclone separator. The oil/aerosol intake port is adapted for coupling to a vent for a space of an internal combustion engine. The cyclone separator further includes an aerosol exhaust port centrally-mounted to the top of the cyclone separator. The aerosol exhaust port is adapted for coupling to an engine suction conduit. The cyclone separator also includes an oil outlet port centrally-mounted to the bottom of the cyclone separator. The oil outlet port is adapted for coupling to an engine oil sump. A duct extends spirally from the oil/aerosol intake port to the center of the cyclone separator. Oil is separated from aerosols by an increasing centrifugal force as the oil and aerosols pass through the duct toward the center of the cyclone separator.

In a further embodiment, the invention relates to a device coupled between an air vent, a suction conduit and an oil pump all of an internal combustion engine for separating oil and aerosols from an oil and aerosol mixture. The device includes a cylindrical cyclone separator having a center, a top, a bottom and a periphery. The cyclone separator also includes an intake port tangentially-mounted to the periphery and coupled to the engine air vent for receiving the oil and aerosol mixture. An exhaust port is centrally mounted to the top of the cyclone separator and coupled to the engine suction conduit for exhausting the aerosols. An outlet port is centrally-mounted to the bottom of the cyclone separator and coupled to the engine oil sump for returning the oil. A duct spirally extends from the intake port to the center of the cyclone separator, wherein the oils and aerosols are separated by an increasing centrifugal force as the oil and aerosol mixture passes through the duct towards the center of the cyclone separator.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
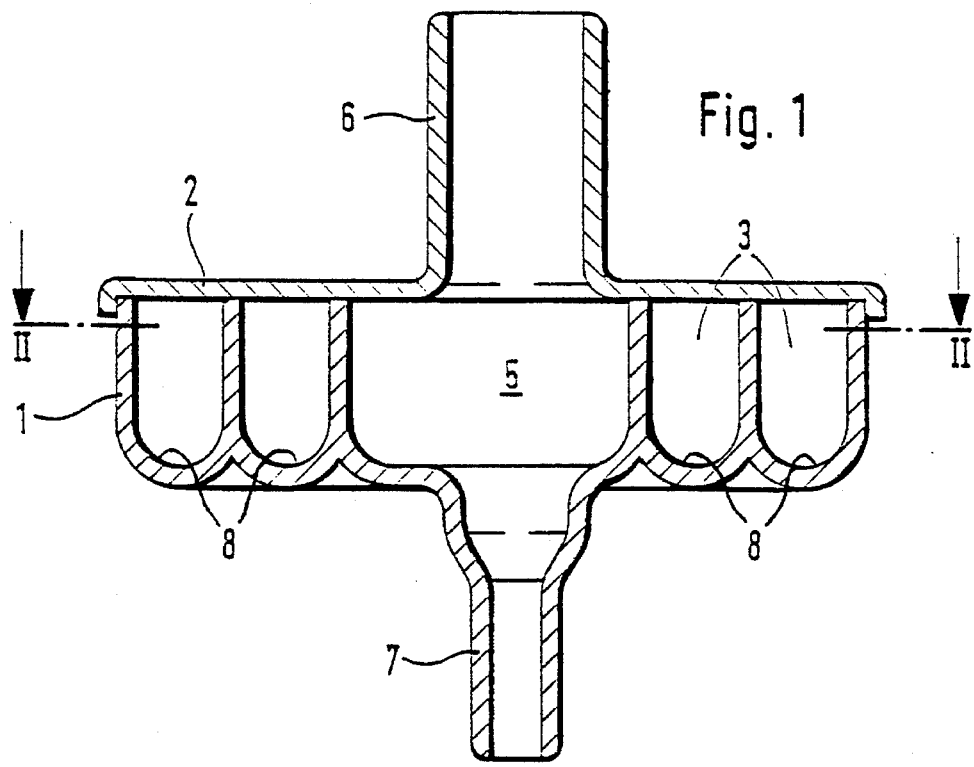
FIG. 1 is a cross-sectional view of a cyclone separator according to the invention, taken along the line I—I from FIG. 2.
Figure 2:
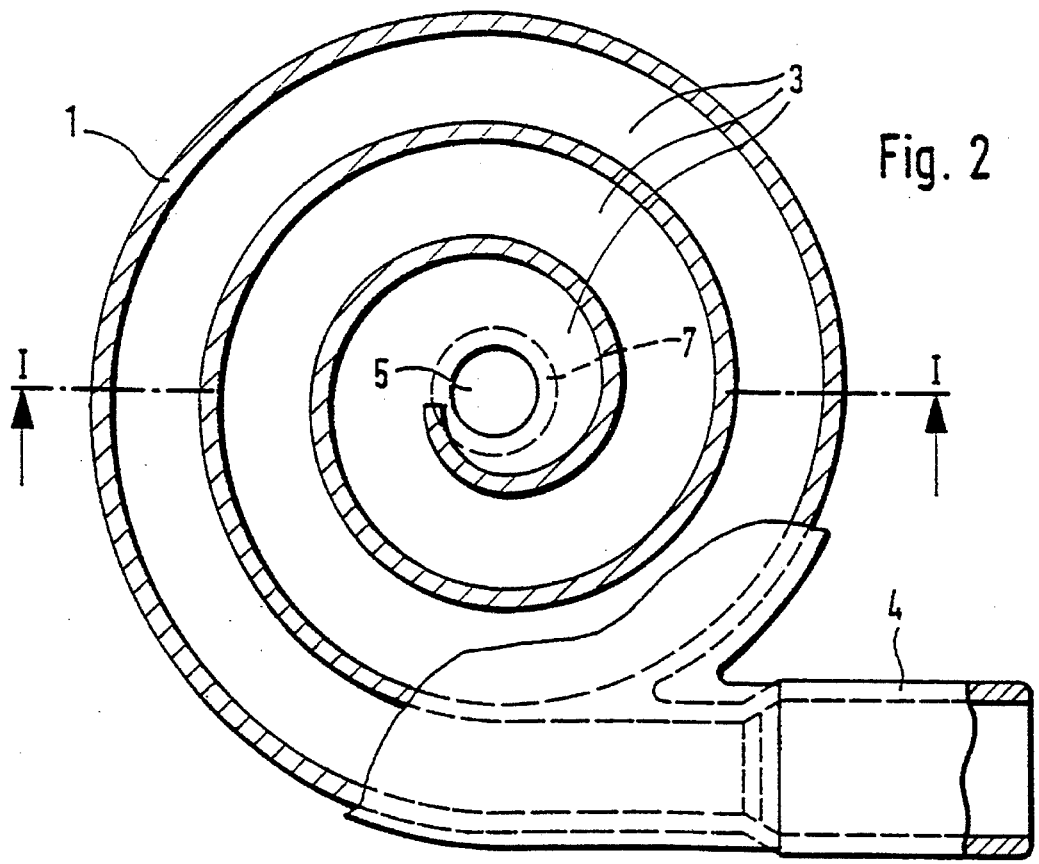
FIG. 2 is a partial cross-sectional view of the cyclone separator, taken along the line II—II from FIG. 1.
Figure 3:
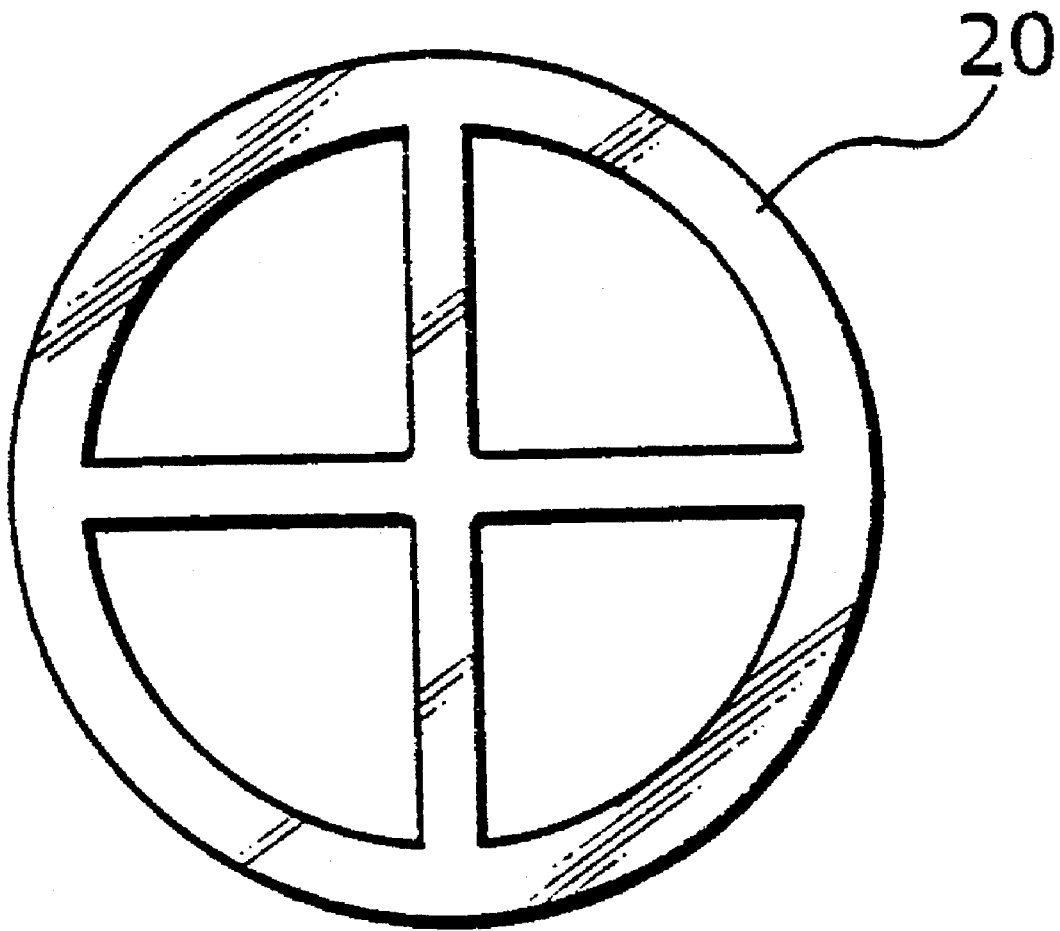
FIG. 3 is a top plan view of an insert for the exhaust port of the cyclone separator.

Referring now in detail to the drawings, and in particular FIGS. 1 and 2, there is shown a housing 1 of a cyclone separator with a cover 2, and a spirally-extending duct or separation duct 3. Duct 3 extends from an air intake port 4 to the center 5. Intake port 4 is coupled to an engine air vent via an intake conduit. A mixture of oil and aerosols passes through the engine air vent and intake conduit into intake port 4 of the cyclone separator. In the center 5, an aerosol exhaust port or exhaust port 6 projects upwardly from housing 1 integral with cover 2. Exhaust port 6 is coupled to an engine suction conduit. An oil outlet port or outlet port 7 projects downwardly from housing 1 into an engine oil sump.

The oil and aerosol mixture entering intake port 4 is separated by centrifugal force as it swirls around inside the cyclone separator. The gaseous aerosols exit exhaust port 6 under influence of the engine suction conduit. The separated aerosols are further processed, for example, burned, in the engine combustion chamber to reduce harmful emissions. Separated oil flows into outlet port 7 under the influence of gravity and enters the engine oil sump.

Duct 3 has a constant cross-sectional area across its entire length, and a rounded bottom surface 8. A uniform cross-sectional area insures a constant flow rate through duct 3. At a constant flow rate, the centrifugal force increases as the radius of duct 3 with respect to center 5 decreases. As the centrifugal force increases, progressively finer oil particles are separated or centrifuged out of the mixture. The fluid flow through duct 3 drives the separated oil toward center 5 and outlet port 7. At the end of duct 3 in the center 5, the lowest portion of rounded bottom surface 8 merges directly into the outlet socket 7. Exhaust port 6 and outlet port 7 are both located at center 5.

Adjacent to center 5, the transition of cover 2 into exhaust port 6 and the transition of bottom surface 8 into outlet port 7 are both designed with curved or rounded edges. Furthermore, immediately below center 5, outlet port 7 has an enlarged opening. These features improve the flow conditions at center 5 and reduce the risk that oil particles will be sucked into exhaust port 6. The cyclone according to the invention can be used in both a horizontal and an inclined configuration. FIG. 3 shows a cross-shaped insert 20 which can optionally be placed into exhaust port 6 to absorb energy from the exhausted gases.

While only a single embodiment of the present invention have been shown and described, it is to be understood that many changes and modifications may be made thereunto without departing from the spirit and scope of the invention as defined in the appended claims.

What is claimed is:

1. A cylindrical cyclone separator for use on an internal combustion engine and having a center, a periphery, a top and a bottom, the cyclone separator comprising:

an oil/aerosol intake port tangentially-mounted to the periphery of the cyclone separator, said oil/aerosol intake port being adapted for coupling to a vent of the internal combustion engine;

an aerosol exhaust port centrally-mounted at the top of the cyclone separator, said aerosol exhaust port being adapted for coupling to the engine suction conduit;

an oil outlet port centrally-mounted at the bottom of the cyclone separator, said oil exhaust port being adapted for coupling to the engine oil sump; and a duct spirally-extending from said oil/aerosol intake port to the center of the cyclone separator, wherein oil is separated from aerosols by an increasing centrifugal force as the oil and aerosols pass through said duct toward the center of the cyclone separator.

2. The cyclone separator according to claim 1, wherein said duct has a generally constant cross-sectional area along the length and wherein the oil and aerosols pass through said duct at a constant flow rate.

3. The cyclone separator according to claim 2, wherein said duct has a rounded bottom surface along its length.

4. The cyclone separator according to claim 3, wherein said duct ends at the cyclone center, and said rounded bottom surface merges directly into the oil outlet port at said duct end.

5. A device coupled between an air vent, a suction conduit and an oil sump, all of an internal combustion engine, for separating oil and aerosols from an oil and aerosol mixture, the device comprising:

(a) a cylindrical cyclone separator having a center, a top, a bottom, and a periphery;

(b) an intake port tangentially-mounted to said periphery and coupled to the engine air vent for receiving the engine oil and aerosol mixture;

(c) an exhaust port centrally-mounted at said top and coupled to the engine suction conduit for exhausting the aerosols;

(d) an outlet port centrally-mounted at said bottom and coupled to the engine oil sump for returning the oil; and (e) a duct spirally-extending from said intake port to said center;

wherein the oil and aerosols are separated by an increasing centrifugal force as the oil and aerosol mixture passes through said duct toward the center of said cyclone separator.

* * * * *